(12) United States Patent
Liutikas

(10) Patent No.: US 8,812,989 B1
(45) Date of Patent: Aug. 19, 2014

(54) DISPLAYING THUMBNAILS

(71) Applicant: Google Inc., Mountain View, CA (US)

(72) Inventor: Aurimas Liutikas, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/010,446

(22) Filed: Aug. 26, 2013

(51) Int. Cl.
G06F 3/00 (2006.01)
G06F 3/0482 (2013.01)

(52) U.S. Cl.
CPC .................................... G06F 3/0482 (2013.01)
USPC ........................................................ 715/838

(58) Field of Classification Search
USPC ................... 715/800, 838, 784, 786
See application file for complete search history.

(56) References Cited

U.S. PATENT DOCUMENTS

| | | | |
|---|---|---|---|
| 6,845,485 B1 | 1/2005 | Shastri et al. | |
| 8,381,131 B1 | 2/2013 | Rosner | |
| 8,593,436 B2* | 11/2013 | Anwar | 345/179 |
| 2006/0022955 A1* | 2/2006 | Kennedy | 345/173 |
| 2011/0185314 A1 | 7/2011 | Sahai et al. | |
| 2012/0233565 A1 | 9/2012 | Grant | |
| 2012/0297302 A1 | 11/2012 | Barraclough et al. | |
| 2013/0290116 A1* | 10/2013 | Hepworth et al. | 705/14.73 |

* cited by examiner

*Primary Examiner* — Thanh Vu

(74) *Attorney, Agent, or Firm* — McDermott Will & Emery LLP

(57) ABSTRACT

A system and machine-implemented method for displaying thumbnails includes receiving thumbnail data corresponding to plural thumbnails. The plural thumbnails are displayed within a display area. A viewing component is displayed within the display area. The viewing component moves within the display area. Differentiated display of at least one of the thumbnails relative to the remaining plural thumbnails is provided, based on the movement of the viewing component.

20 Claims, 4 Drawing Sheets

DISPLAYING THUMBNAILS

BACKGROUND

The present disclosure generally relates to thumbnail images, and in particular, to displaying thumbnails.

Thumbnails are typically displayed in a static manner. For example, thumbnails within a tabbed interface of an application (e.g., a web browser) are displayed as static icons representing a reduced image of a graphic or document page.

SUMMARY

The disclosed subject matter relates to a machine-implemented method of displaying thumbnails. The method comprises receiving thumbnail data corresponding to plural thumbnails, and displaying the plural thumbnails within a display area. The method further comprises displaying a viewing component within the display area, wherein the viewing component moves within the display area, and providing for differentiated display of at least one of the thumbnails relative to the remaining plural thumbnails, based on the movement of the viewing component.

The disclosed subject matter further relates to a system for displaying thumbnails. The system comprises one or more processors, and a machine-readable medium comprising instructions stored therein, which when executed by the processors, cause the processors to perform operations comprising receiving thumbnail data corresponding to plural thumbnails. The operations further comprise displaying the plural thumbnails within a display area, and displaying a viewing component within the display area, wherein the viewing component moves within the display area. In addition, the operations comprise providing for magnified display of at least one of the thumbnails relative to the remaining plural thumbnails, based on the movement of the viewing component.

The disclosed subject matter also relates to a machine-readable medium comprising instructions stored therein, which when executed by a system, cause the system to perform operations comprising receiving thumbnail data corresponding to plural thumbnails. The operations further comprise displaying the plural thumbnails within a display area, and displaying a viewing component within the display area, wherein a size of the viewing component is less than a size of the display area, and wherein the viewing component moves within the display area. In addition, the operations comprise providing for differentiated display of at least one of the thumbnails relative to the remaining plural thumbnails, based on the movement of the viewing component.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, thumbnails are typically displayed in a static manner. As used herein, a "thumbnail" corresponds to its plain and ordinary meaning including, but not limited to a reduced image of a graphic or document page. Thumbnails can be used to view multiple images on a screen simultaneously or to download such images more rapidly. For example, thumbnails within a tabbed interface of an application (e.g., a web browser) are displayed as static icons.

On devices such as mobile devices, the visibility of thumbnails can be limited by the size of the display screen. For example, if several thumbnails are displayed on the screen of a mobile device, the display of each icon may be difficult for an end user to see. In some cases, the user may wish to passively view the content of a thumbnail, without necessarily having to link to the actual image or document associated with the thumbnail.

The subject technology provides for displaying thumbnails. Thumbnail data corresponding to plural thumbnails is received, and the plural thumbnails are assigned to a display area. A viewing component (e.g., window, magnifying glass) is displayed in association with the display area. The viewing component moves within the display area. At least one of the thumbnails is displayed based on the movement of the viewing component.

Figure 1:
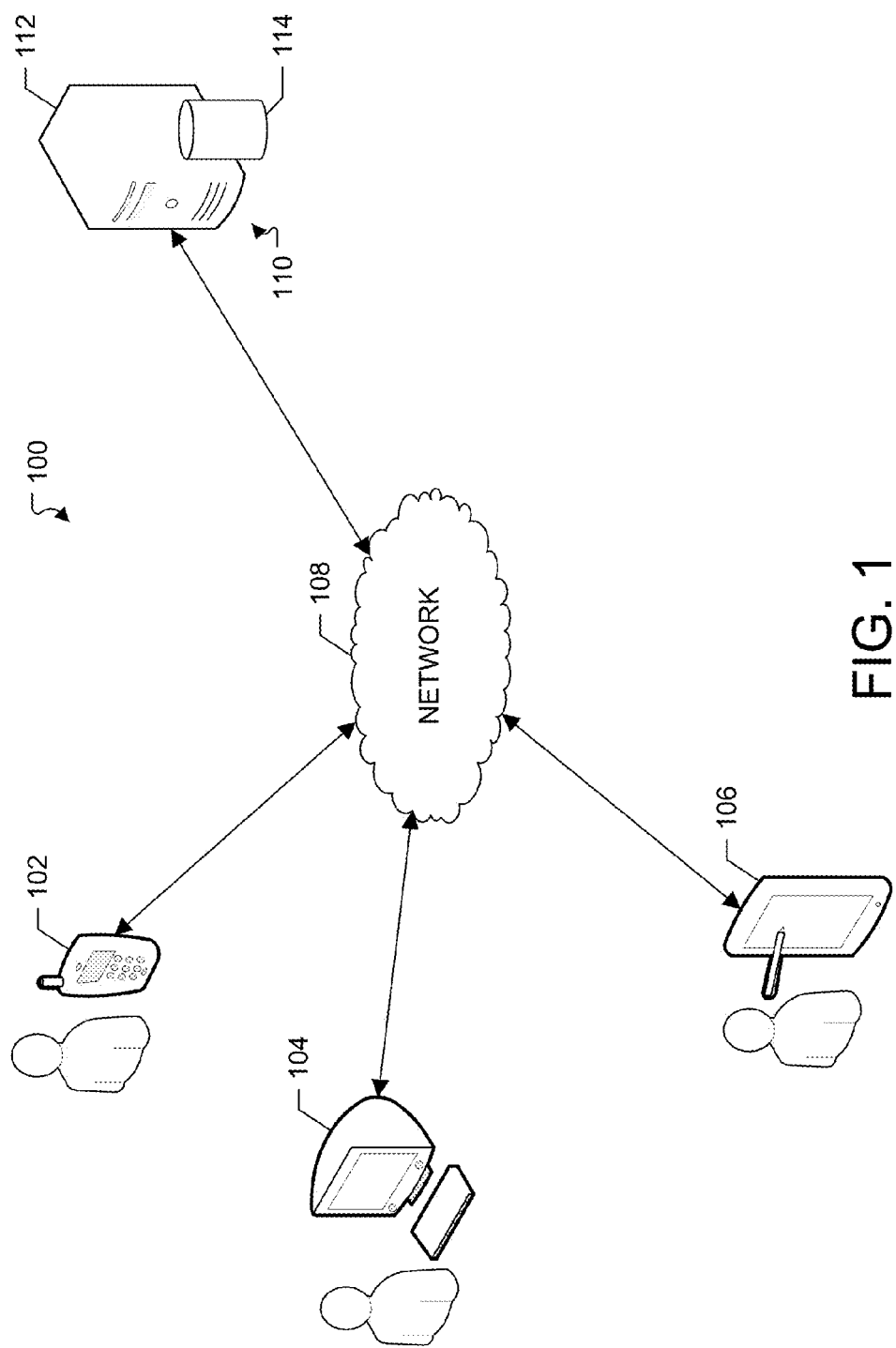
FIG. 1 illustrates an example network environment in which thumbnails can be displayed.

FIG. 1 illustrates an example network environment in which thumbnails can be displayed. A network environment 100 includes computing devices 102, 104 and 106 (hereinafter "102-106") and computing system 110. Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, any of computing devices 102-106 provide for displaying thumbnails. The computing device receives thumbnail data corresponding to plural thumbnails. The thumbnail data can correspond to thumbnails of images and/or document pages. The thumbnails, and the images and/or document pages corresponding to the thumbnails, can be retrieved from local memory on computing device 102-106, or can be remotely retrieved (e.g., from server 110).

For example, server 110 provides the thumbnail data to client device (e.g., 102-106), in response to a request by the client device. Processing device 112 executes computer instructions stored in data store 114, for example, to host a website which provides for thumbnail data and the images/document pages corresponding to the thumbnails. A user of any of computing devices 102-106 can enter a request for the thumbnail data on the computing device (e.g., a search request in a case where server 110 is a search engine, a request for user profile content in the case where server 110 is website such as a social networking website), and server 110 can provide the thumbnail data in response to the request. As noted above, the thumbnail data displayed on the client device is not limited to remote thumbnail data, and can include local data, remote data or both local and remote data.

The computing device (e.g., 102-106) displays the plural thumbnails within a display area, for example, the display of the computing device. The computing device further displays a viewing component within the display area, where the viewing component moves within the display area. In addition, the computing device provides for differentiated display of at least one of the thumbnails relative to the remaining plural thumbnails, based on the movement of the viewing component.

Figure 2A:
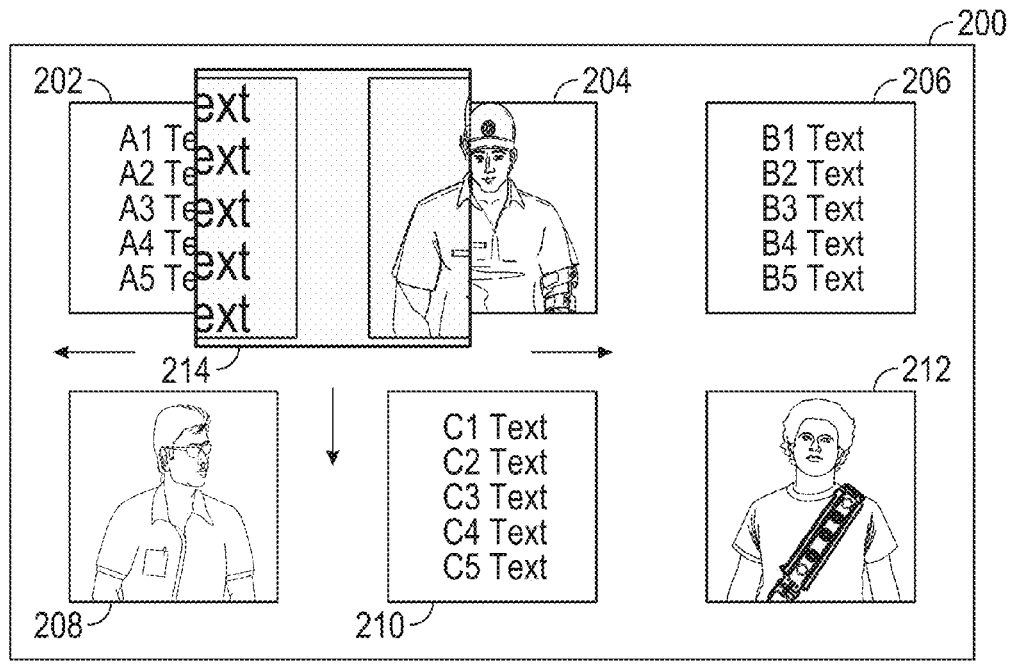
FIGS. 2A-2B illustrate an example user interface for displaying thumbnails.
Figure 2B:
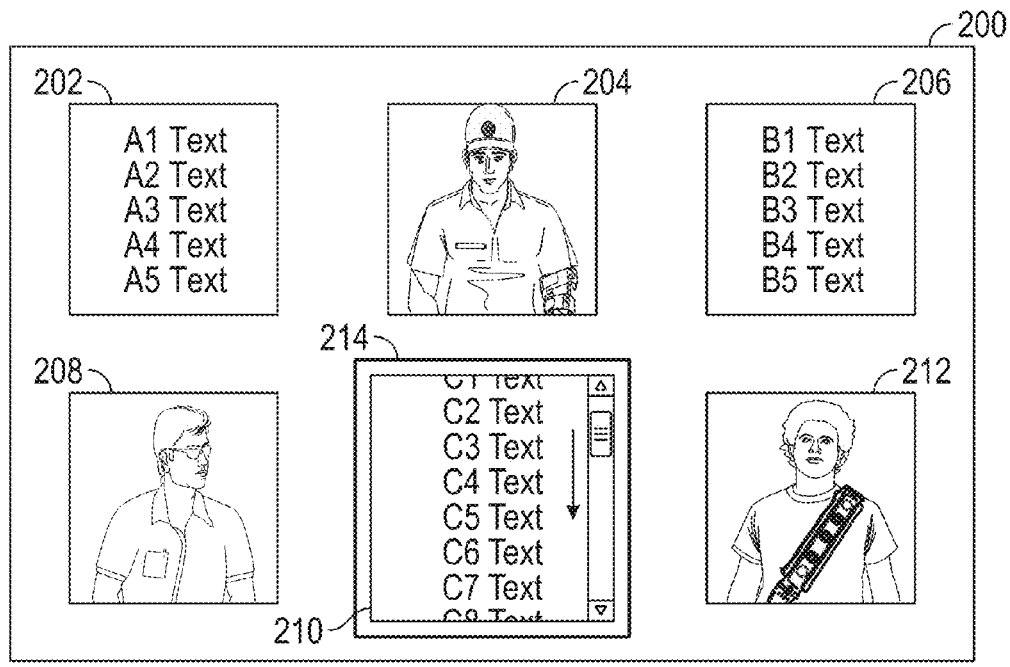

FIGS. 2A-2B illustrate an example user interface for displaying thumbnails. FIGS. 2A-2B illustrate a display area 200 in which thumbnails 202, 204, 206, 208, 210 and 212 (hereinafter "202-212") are displayed. Each of thumbnails 202-212 represent a reduced image of a graphic or document page. While FIGS. 2A-2B illustrate an example with six thumbnails 202-212, the subject technology is not limited to such and any number of thumbnails can apply.

Regarding FIG. 2A, display area 200 corresponds to a graphical interface provided within an application accessed by a computing device (e.g., any of computing devices 102-106). Examples of an application for displaying thumbnails include, but are not limited to, an application for searching images or documents, a mapping application (e.g., where map data is displayed as thumbnails), and a social networking application (e.g., where contact information or user profile content is displayed as thumbnails). The application may be local (e.g., running on computing device 102-106) or remote (e.g., hosted on server 110). In example aspects, the application is a web browser.

Display area 200 can be displayed in a full screen mode covering the entirety of the display (e.g., monitor) for the computing device. Alternatively, display area 200 can be displayed in a windowed mode, in which display area 200 does not cover the device display (e.g., monitor).

In full screen mode, the size of the display area can be equal or substantially equal to the size of the device display. As such, all of the plural thumbnails (e.g., thumbnails 202-212) are visible within the device display at the same time. Alternatively, display area 202 can extend beyond the device display. As such, only a portion of thumbnails 202-212 are visible within the device display at the same time. The visible portion of thumbnails 202-212 can be adjusted by a user of the computing device, for example, by user input including, but not limited to, scrolling (e.g., via a scrollbar), dragging (e.g., via touch or mouse input) or tilting (e.g., via an accelerometer).

Display area 200 further includes a viewing component 214 which moves among the thumbnails 202-212 within display area 200. Although viewing component 214 is depicted as a rectangular window, viewing component 214 can correspond to other shapes, including but not limited to, a magnifying glass, an ellipse, a circle, a triangle, or any other shape. In addition, viewing component 214 can include a visible border or a clear border (e.g., invisible, substantially invisible border).

Viewing component 214 can be used to view any of thumbnails 202-212. More particularly, based on its movement and/or current position, viewing component 214 provides for differentiated display of one or more thumbnails (e.g., 202, 204, as in FIG. 2A) relative to the remaining thumbnails (e.g., 206-212). For example, viewing component 214 can provide for a magnified display of the thumbnail(s) beneath viewing component 214. Other non-limiting examples of differentiated display include changing the shape, size and/or color of images or text data within the thumbnail(s) beneath viewing component 214.

The movement of viewing component 214 within display area 200 can be controlled in different ways. For example, viewing component 214 can automatically move within display area, based on a preset algorithm for moving among thumbnails 202-212. The preset algorithm may direct the viewing component 214 to move randomly within display area 200, or may follow a predefined pattern.

Alternatively, or in addition, the movement of viewing component 214 can be manually controlled via user input. For example, one or more input gestures (e.g., dragging, flicking, tapping, swiping) via mouse, keyboard or touch input can be used to control movement of viewing component 214. These gestures can control all movement for viewing component 214, or can be used in conjunction with default automatic movement for viewing component 214 to direct movement for viewing component 214.

In cases where the size of display area 200 exceeds that of the device display (e.g., the display area extends beyond the device display), the movement of viewing component 214 may also control which portion of display area is visible. For example, if viewing component 214 moves in a particular direction (e.g., up, down, left or right) the visible portion of display area 202 within the device display may track this direction until reaching a corresponding edge of display area 200.

The application in which display area 200 is provided may include a settings interface for adjusting the movement settings for viewing component 214. For example, the settings interface can provide for a user to adjust settings for automatic movement, manual movement and speed of movement for viewing component 214. These settings may be stored locally (e.g., for local applications) or remotely (e.g., for remote applications). If stored remotely, these setting can be applied to multiple devices, for example, in association with a user profile.

Regarding FIG. 2B, in addition to providing for differentiated display of thumbnail(s), viewing component 214 can provide for passively viewing content for a particular thumbnail. For example, the application can be configured to receive user input indicating a passive selection of a thumbnail from the plurality of thumbnails. The user input to indicate such passive selection can include, for example, receiving accelerometer input (e.g., via an accelerometer within or coupled to computing device 102) corresponding to a tilt motion. This tilt motion may be performed in association with a user-selected thumbnail.

The thumbnail can be selected by the user by via user input, such as dragging and locking viewing component 214 to the desired thumbnail, or clicking on view component 214 (e.g., along an edge of viewing component 214) while positioned up on top the desired thumbnail. In FIG. 2B, thumbnail 210 is selected for passive viewing. In this example, thumbnail 210 is displayed with viewing component 214 as a border. Although not shown in FIG. 2B, the content of thumbnail 210 can be magnified.

In example aspects, the passive viewing of content corresponds to displaying content associated with the selected thumbnail without directing the application (e.g., website on a web browser) to the link or address corresponding to the selected thumbnail. For example, the passive viewing can correspond to scrolling (e.g., in FIG. 2B) through the content of the link or address corresponding to the selected thumbnail, during the differentiated (e.g., magnified) display of the thumbnail. Thus, by performing a tilt motion for a selected thumbnail, the user can scroll through the corresponding content of the link or address. In example aspects, the scrolled content can be obtained in real-time (e.g., from device memory for local content, or from server 110 for remote content).

Alternatively, or in addition, the application can receive user input indicating an active selection of a thumbnail from among the plurality of thumbnails. Examples of user input for active selection of the thumbnail include, but are not limited to, direct clicking or double-clicking (e.g., via mouse or touch input) on the thumbnail. The user can select any of thumbnails 202-212 using this type of input, regardless of whether that thumbnail is currently positioned beneath viewing component 214. In response to the received user input, the application can direct the user to the link or address corresponding to the selected thumbnail.

Figure 3:
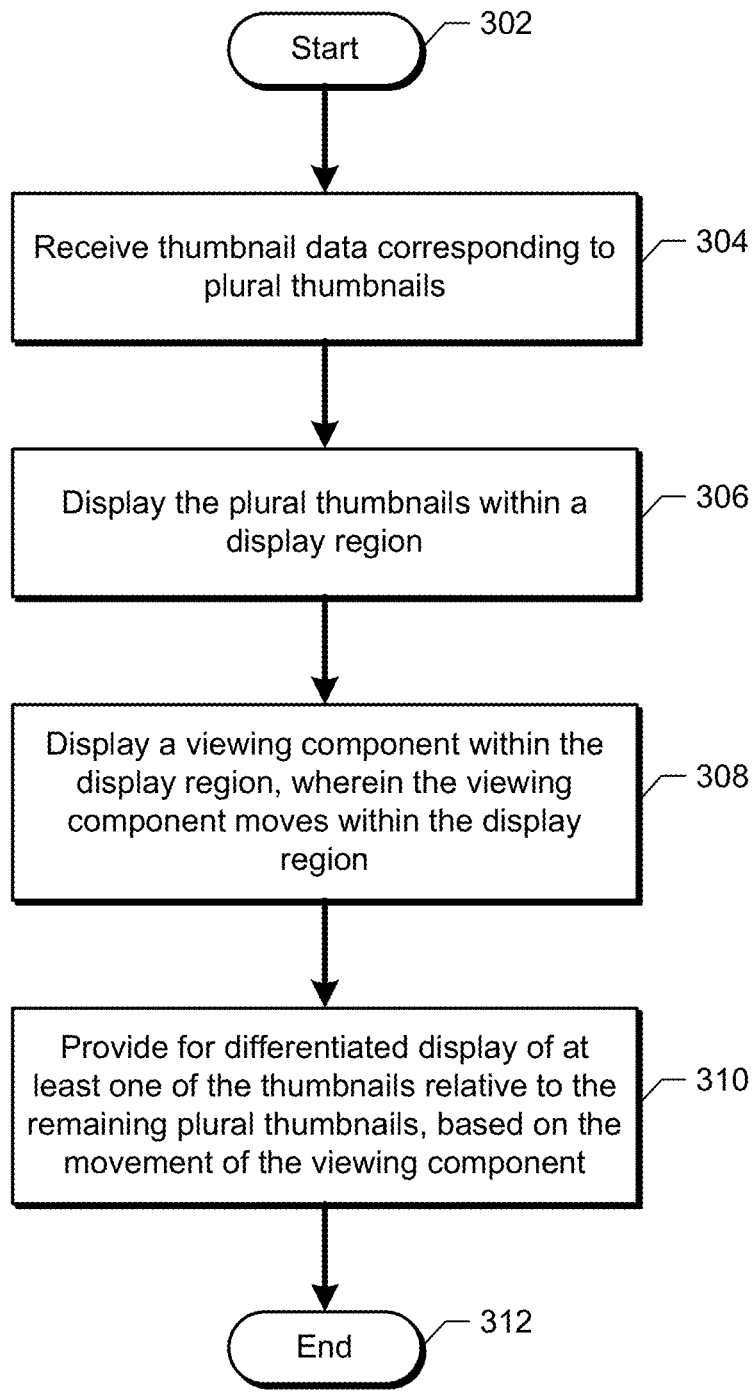
FIG. 3 illustrates an example process by which thumbnails are displayed.

FIG. 3 illustrates an example process by which thumbnails are displayed. Following start block 302, thumbnail data corresponding to plural thumbnails is received at step 304. At step 306, the plural thumbnails are displayed within a display area.

At step 308, a viewing component is displayed within the display area. The viewing component moves within the display area. The movement of the viewing component can be automatically set. Alternatively, or in addition, user input can be received in association with the viewing component, and the movement of the viewing component can be based on the received user input.

A size of the viewing component can be less than a size of the display area. The display area can extend beyond a device display (e.g., a display of computing device 102-106). Alternatively, the display area can be smaller than or equal to a device display.

At step 310, based on the movement of the viewing component, display of at least one of the thumbnails is differentiated relative to the remaining plural thumbnails. The viewing component can be one of a window or a magnifying glass through which the at least one thumbnail is viewed, based on the movement of the viewing component. The differentiated display of the at least one thumbnail can correspond to magnified display relative to the remaining plural thumbnails.

User input indicating a passive selection of a thumbnail from the plurality of thumbnails can be received. In response to the received user input, a scrolling action can be performed within the selected thumbnail, and movement of the viewing component within the display area can stop. The user input indicating the passive selection can correspond to accelerometer input.

Alternatively, or in addition, user input indicating an active selection of a thumbnail from among the plurality of thumbnails can be received. In response to the received user input, the user to can be directed to a link or address corresponding to the selected thumbnail. The user input indicating the active selection can correspond to a mouseclick input or to touch input.

Figure 4:
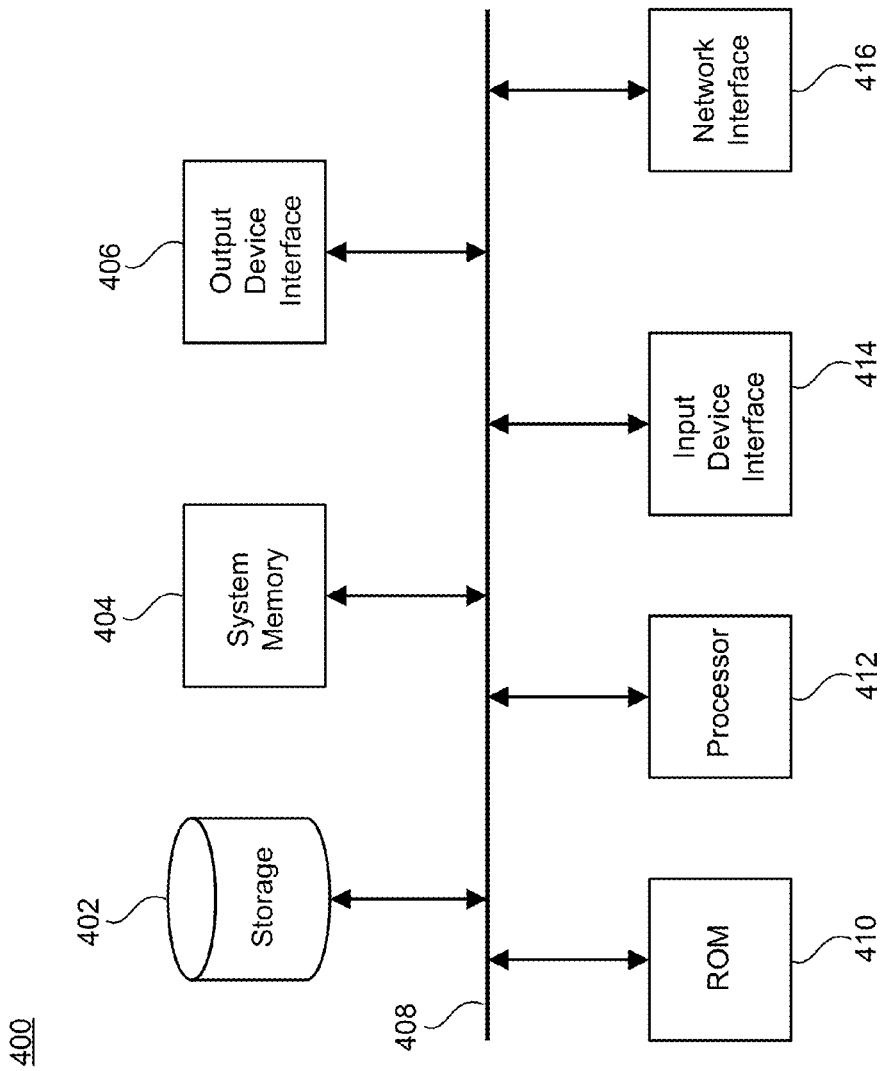
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for displaying thumbnails in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of displaying thumbnails, the method comprising:
   receiving thumbnail data corresponding to plural thumbnails;
   displaying the plural thumbnails within a display area;
   displaying a viewing component within the display area, wherein the viewing component moves within the display area;
   providing for differentiated display of at least one of the thumbnails relative to the remaining plural thumbnails, based on the movement of the viewing component;
   receiving user input indicating a passive selection of a thumbnail from among the plural thumbnails;
   obtaining, in response to the received user input, content for scrolling within the selected thumbnail; and
   scrolling through the obtained content within the selected thumbnail.

2. The method of claim 1, wherein the viewing component is one of a window or a magnifying glass through which the at least one thumbnail is viewed, based on the movement of the viewing component.

3. The method of claim 1, wherein the differentiated display of the at least one thumbnail corresponds to magnified display relative to the remaining plural thumbnails.

4. The method of claim 1, wherein the movement of the viewing component corresponds to default movement which is automatic and requires no user interaction.

5. The method of claim 1, further comprising:
receiving user input in association with the viewing component, wherein the movement of the viewing component is based on the received user input.

6. The method of claim 1, further comprising
stopping, in response to the received user input, movement of the viewing component within the display area.

7. The method of claim 1, wherein the user input indicating the passive selection comprises accelerometer input.

8. The method of claim 1, further comprising:
receiving second user input indicating an active selection of a second thumbnail from among the plurality of thumbnails; and
directing, in response to the received second user input, the user to a link or address corresponding to the selected second thumbnail.

9. The method of claim 8, wherein the user input indicating the active selection comprises at least one of mouseclick input or touch input.

10. The method of claim 1, wherein a size of the viewing component is less than a size of the display area.

11. The method of claim 1, wherein the display area extends beyond a device display.

12. The method of claim 1, wherein the display area is smaller than or equal to a device display.

13. A system for displaying thumbnails, the system comprising:
one or more processors; and
a machine-readable medium comprising instructions stored therein, which when executed by the processors, cause the processors to perform operations comprising:
receiving thumbnail data corresponding to plural thumbnails;
displaying the plural thumbnails within a display area;
displaying a viewing component within the display area, wherein the viewing component moves within the display area;
providing for magnified display of at least one of the thumbnails relative to the remaining plural thumbnails, based on the movement of the viewing component;
receiving user input indicating a passive selection of a thumbnail from among the plural thumbnails;
obtaining, in response to the received user input, content for scrolling within the selected thumbnail; and
scrolling through the obtained content within the selected thumbnail.

14. The system of claim 13, wherein the viewing component is one of a window or a magnifying glass through which the at least one thumbnail is viewed, based on the movement of the viewing component.

15. The system of claim 13, wherein the movement of the viewing component corresponds to default movement which is automatic and requires no user interaction.

16. The system of claim 13, the operations further comprising:
receiving user input in association with the viewing component, wherein the movement of the viewing component is based on the received user input.

17. The system of claim 13, the operations further comprising:
stopping, in response to the received user input, movement of the viewing component within the display area.

18. The system of claim 13, wherein the user input indicating the passive selection comprises accelerometer input.

19. The system of claim 13, the operations further comprising:
receiving second user input indicating an active selection of a second thumbnail from among the plurality of thumbnails; and
directing, in response to the received second user input, the user to a link or address corresponding to the selected second thumbnail.

20. A machine-readable medium comprising instructions stored therein, which when executed by a system, cause the system to perform operations comprising:
receiving thumbnail data corresponding to plural thumbnails;
displaying the plural thumbnails within a display area;
displaying a viewing component within the display area, wherein a size of the viewing component is less than a size of the display area, and wherein the viewing component moves within the display area;
providing for differentiated display of at least one of the thumbnails relative to the remaining plural thumbnails, based on the movement of the viewing component;
receiving user input indicating a passive selection of a thumbnail from among the plural thumbnails;
obtaining, in response to the received user input, content for scrolling within the selected thumbnail; and
scrolling through the obtained content within the selected thumbnail.

* * * * *